UNITED STATES PATENT OFFICE.

ERVIN B. STACK, OF MONROE, NORTH CAROLINA.

BELT-DRESSING.

1,211,638.    Specification of Letters Patent.    Patented Jan. 9, 1917.

No Drawing.    Application filed May 22, 1916. Serial No. 99,234.

*To all whom it may concern:*

Be it known that I, ERVIN B. STACK, a citizen of the United States, residing at Monroe, in the county of Union and State of North Carolina, have invented certain new and useful Improvements in Belt-Dressings; and I do declare the following to be a full, clear, and exact description of the invention, such as will enable others skilled in the art to which it appertains to make and use the same.

My invention relates to belt dressing, suitable for application to belts, which may be leather belts or the like, on pulleys, for the purpose of preventing the belt from slipping, to retain the belt in a pliable and non-brittle condition and prevents cracking of the belt. The belt dressing of my invention acts as a preservative of the leather, in addition to its prevention of slipping of the belt on the pulley.

The composition is preferably made up of the following ingredients, preferably in the portions stated, which portions may be varied more or less, and the coloring matter referred to as an ingredient of the composition may be omitted if desired. The materials and portions are as follows:—

| | |
|---|---|
| Rosin | 61% |
| Beeswax | 8% |
| Linseed oil | 7% |
| Heavy grease | 7% |
| Pumice stone | 16% |
| Oil-soluble coloring matter or dye | 1% |
| | 100% |

The belt dressing is a plastic composition which may be put up in the form of bricks or cakes, and is preferably prepared from the materials as follows. The linseed oil is first boiled, and the coloring matter or dye, if it is to be used, may be added to the same, either in a heated or cool condition. The oil is then mixed with the other materials which have been heated together to about a temperature of 100° C. at which temperature the mixture is in a liquid state, and then after thoroughly mixing, may be poured into molds, or poured out on a flat surface and allowed to cool, whereby the mixture assumes a plastic, stiff, and pasty condition.

The belt dressing is applied to the belt in the ordinary manner, by rubbing the bricks or cakes against the surface of the moving belt.

The pumice stone in this mixture appears to exercise a peculiar function in that it produces a rough surface on the belt and pulley preventing slipping.

What I claim is:—

1. A composition of matter in the form of a plastic mass, comprising, rosin, linseed oil, beeswax, heavy grease, and pumice stone, the amount of rosin being more than one half of the entire composition.

2. A composition of matter in the form of a plastic mass, comprising, rosin, linseed oil, beeswax, heavy grease, pumice stone, and a coloring matter soluble in the menstrum, the amount of rosin being more than one half of the entire composition.

3. A composition of matter comprising a plastic mass composed of the following materials, in substantially the portions stated:

| | |
|---|---|
| Rosin | 61% |
| Beeswax | 8% |
| Linseed oil | 7% |
| Heavy grease | 7% |
| Pumice stone | 16% |
| Oil-soluble coloring matter or dye | 1% |
| | 100% |

In testimony whereof I have hereunto set my hand in the presence of two subscribing witnesses.

ERVIN B. STACK.

Witnesses:
 O. W. KOCHINZKY,
 S. A. WARLICK.